United States Patent Office 3,851,030
Patented Nov. 26, 1974

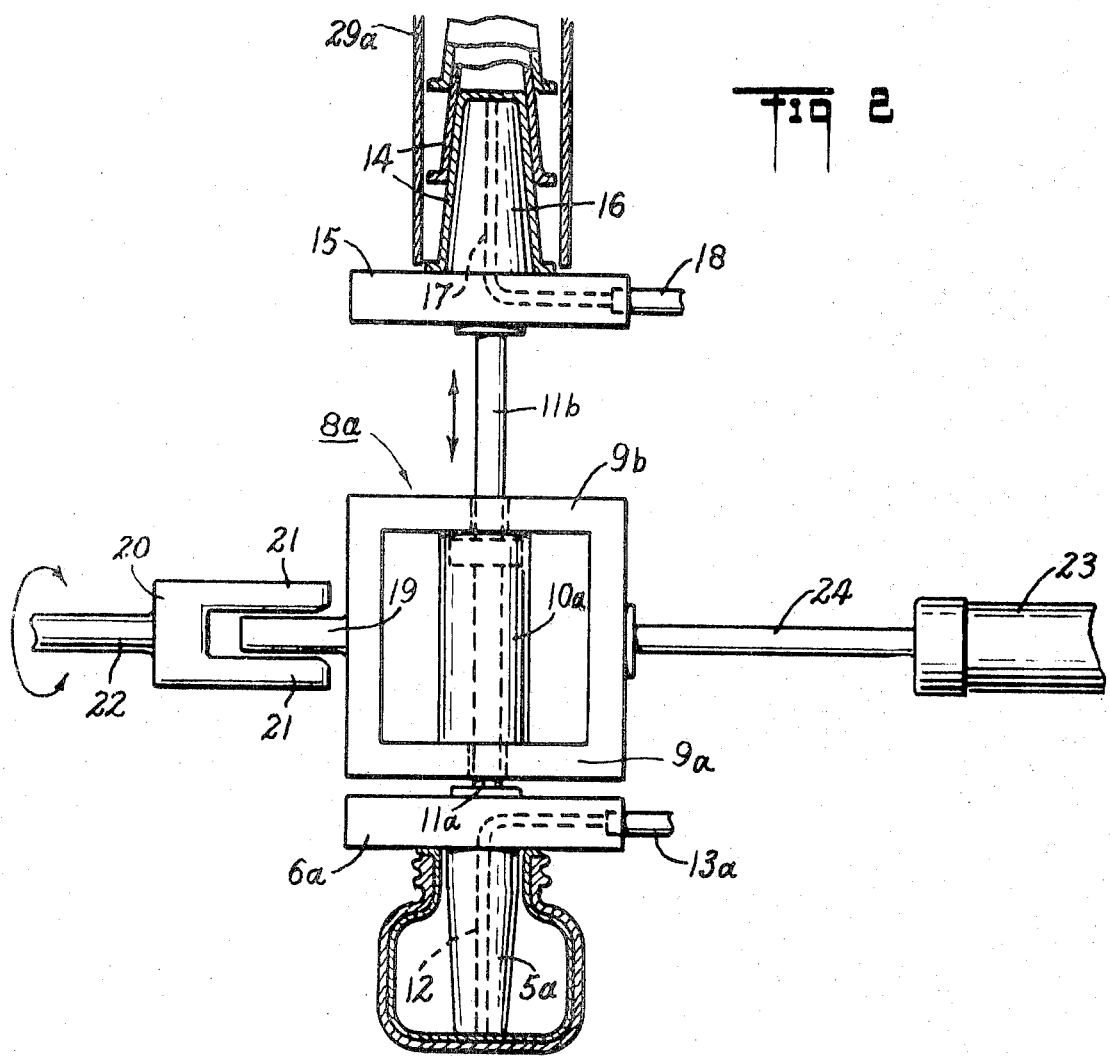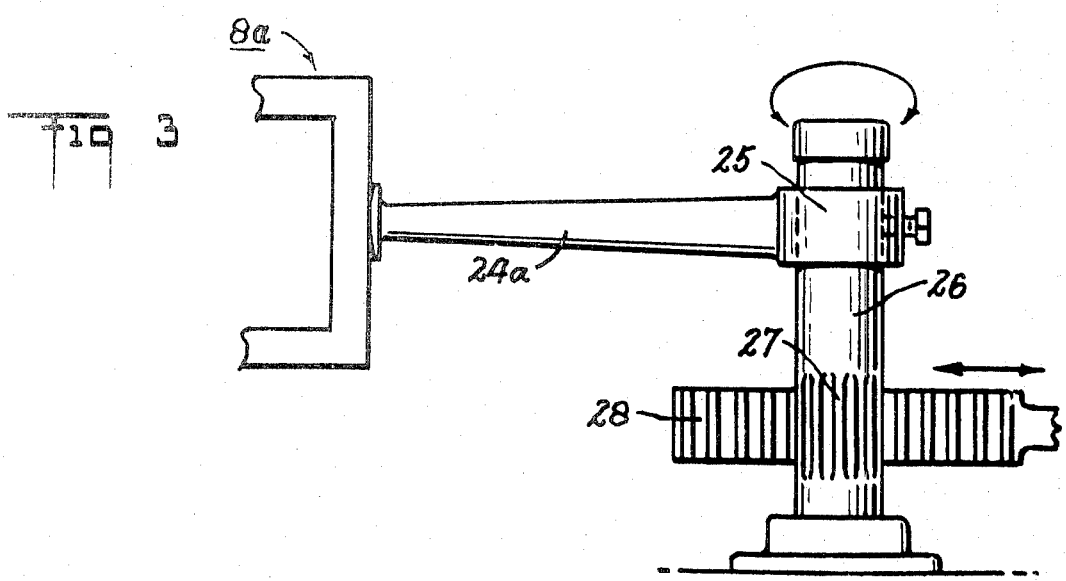

3,851,030
METHOD FOR THE PRODUCTION OF
COMPOSITE CONTAINERS
Emery I. Valyi, 5200 Sycamore Ave.,
Riverdale, N.Y. 10471
Original application Dec. 23, 1971, Ser. No. 211,314, now
Patent No. 3,768,940, dated Oct. 30, 1973. Divided
and this application Feb. 7, 1973, Ser. No. 330,274
Int. Cl. B29c 17/07; B29d 3/02
U.S. Cl. 264—97
10 Claims

ABSTRACT OF THE DISCLOSURE

Method for forming composite containers in an injection blow molding cycle. A transfer device preformed liners is shifted from a liner receiving position into a position to introduce a liner into the blow mold after the finished article has been removed from the blow mold. The blow mold then acts as a liner carrier to transfer the liner to the blow core as the blow core is introduced into the parison mold for the molding of the parison.

Figure 1:
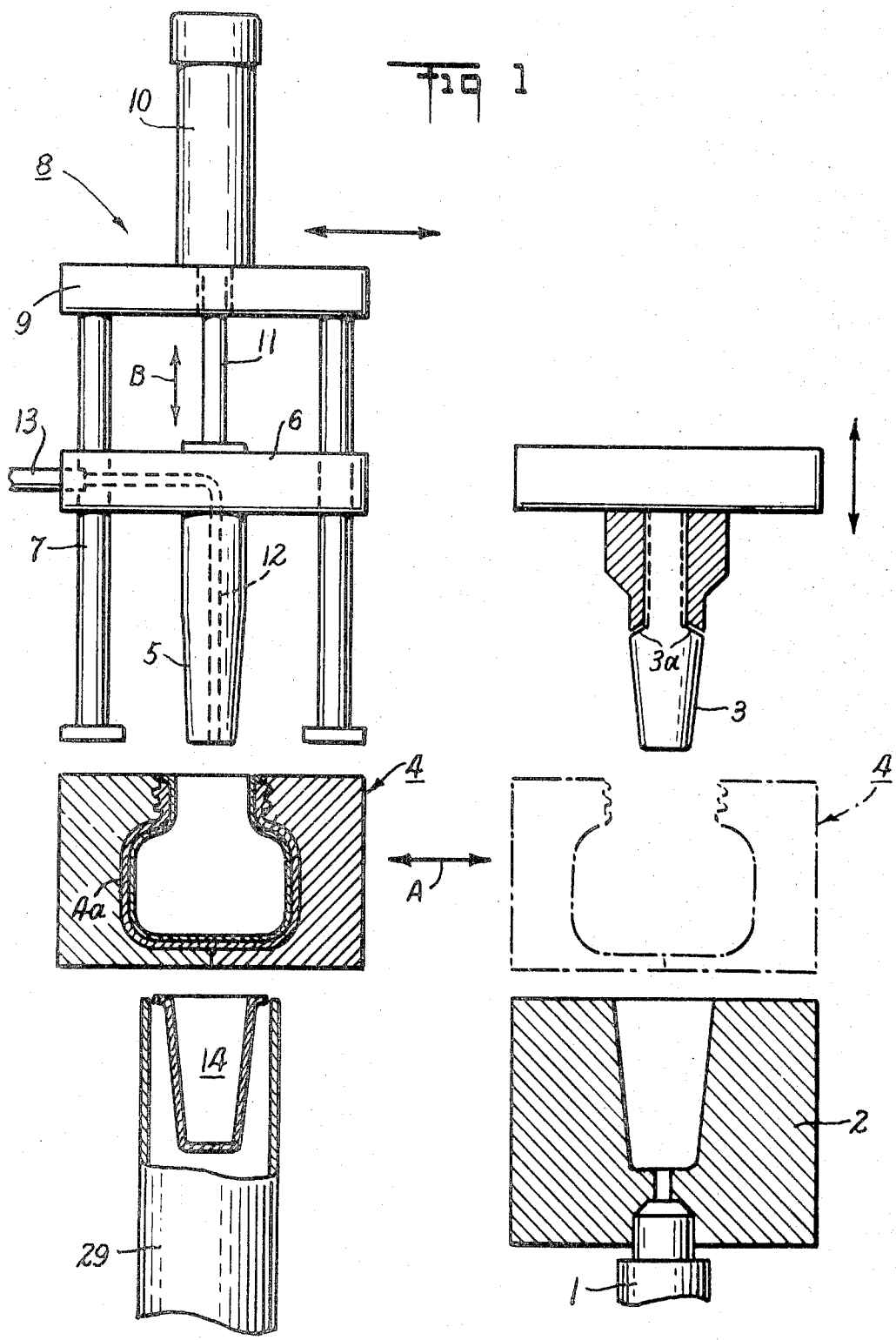

This is a division, of application Ser. No. 211,314 filed Dec. 23, 1971, now Pat. No. 3,768,940.

This invention relates to the introduction of liners used in the production of composite blow molded containers as more fully described in my co-pending U.S. Patent application Ser. No. 71,734, filed Sept. 14, 1970, now Pat. No. 3,717,544, according to which previously formed liners are applied to the blow core of an injection blow molding apparatus, plastic is injected around said liners while on the cores, and the composite, consisting of the liners and the injected plastic is expanded together into conformance with a blow mold. The method of injection blow molding is well known and described, for example in U.S. Pat. No. 3,029,468 and other patents.

Upon completion of the injection blow molding operation, as by means of apparatus described in the aforenamed patent, the finished article must be removed from the apparatus, and more particularly from the blow mold, preferably in such a manner that the article may then conveniently, quickly and without damage be transferred to the package in which it is to be shipped to a point of use, or to a subsequent operation, such as inspection, or decoration. To that end, it is preferred to maintain the orientation of the finished article accurately during removal, by means of a mechanical handling device, rather than to allow the article to drop at random from the molding apparatus. Such a mechanical handling device is for example described in my U.S. Pat. No. 3,587,133.

The procedures of liner insertion and article removal are comparatively time consuming and require individual devices that must be operated without interference with the basic operating cycle of blow molding.

It is an object of the invention to provide a method for combining the operation of article removal with that of liner insertion with the least time delay.

In accordance with the present invention, a handling device is used, one portion of which is the liner inserting apparatus, while another portion, mechanically linked together with the first portion, serves to remove finished articles.

The nature of the invention will be better understood from the following description taken in connection with the accompanying drawings in which FIG. 1 is an elevation, partly in section, of an injection blow molding apparatus equipped with a device for the insertion of liners;

FIG. 2 is an elevation, partly in section, of a device for the insertion of liners and the removal of finished articles; and FIG. 3 is an elevation, partly in section, of an alternate drive means for the device according to FIG. 2.

Referring to the drawings more in detail, FIG. 1 shows the elements of an injection blow molding machine adapted to produce composite containers, wherein hot, flowable plastic is injected through nozzle 1 into parison mold 2 when blow core 3 is in a position to provide a closed mold cavity in combination with the parison mold. In order to bring the blow core into that position, it is arranged to be movable in the direction of the vertical arrow, by conventional means, not shown. Prior to insertion of the blow core 3 into parison mold 2, a liner 14 is applied to the blow core in a manner to be described below. Upon placing the blow core, with the liner thereon, into molding position in parison mold 2, plastic is injected and the liner is heated by the hot plastic flowing into the mold and at times also by the blow core 3 itself which may be heated for that purpose, as by conventional fluid circulation, or electrically. A parison is thus formed, composed of an inner layer corresponding to the liner 14 and an outer layer of freshly injected plastic. While still at a sufficiently elevated temperature for extensive deformation, the parison, while still upon the blow core is now placed into the cavity 4a of blow mold 4. For that purpose, blow mold 4 may be moved in the direction of the horizontal arrow A into alignment with the blow core as indicated by the dot-dash lines in FIG. 1. Upon insertion of the blow core and of the parison into the blow mold, pressure fluid is admitted through blow slot 3a of the blow core and the composite parison is expanded into conformance with the blow mold cavity 4a. The blow core is now removed from the blown article in the blow mold and the latter is returned, with the blown article therein to a discharge position as shown in full lines in FIG. 1, that is away from the path of the blow core, in which position the finished artcile may be removed without interfering with subsequent movements of the blow core. To facilitate such article removal, the blow mold 4 may be constructed of two or more parts, as shown.

The finished article may be conveniently removed by means of attachment 8, in which a plug 5 is carried by platen 6, arranged to slide in the direction of the arrow B upon tierods 7 under the action of fluid cylinder 10 mounted on base platen 9. Cylinder 10 is connected to platen 6 by means of piston rod 11. Plug 5 may have a channel 12, terminating at the bottom face thereof, connected to a source of vacuum, or to a source of compressed air, or alternatingly to both, by means of pipe 13.

In operation, plug 5 is inserted into the blown article in the blow mold when the blow mold is in discharge position. Vacuum is applied through channel 12 and the bottom of the article is therefore caused to adhere to the bottom face of plug 5. The blow mold is then actuated to release the article and is removed from the path of the plug 5 leaving the article attached to the plug. Attachment 8, carrying plug 5 and the finished article, may now be moved to the location where it is desired to discharge th finished article. The movements of attachment 8 are effected by conventional means, not shown in FIG. 1.

After release of the finished article from attachment 8, the attachment may be moved by suitable means into alignment with magazine 14a containing a linear 14 as indicated in FIG. 1. At that location, plug 5 may be inserted into the liner, under action of cylinder 10, as previously described in connection with the removal operation, and the attachment with the liner 14 carried by the plug 5 is again brought into alignment with the now empty blow mold. During such movement, the liner 14 is caused to adhere to plug 5 under action of suction applied through channel 12, as before. The plug 5 with the liner thereon is inserted into the blow mold and released by ceasing to apply suction or, if necessary, by applying fluid pressure through channel 12. Plug 5 is removed from the blow mold and the blow mold 4, with the liner therein, is brought into alignment with the blow core 3, to which the liner is applied in the next step of the operation, after which a new cycle is initiated.

FIG. 2 shows attachment 8a embodying two base platens 9a and 9b with a fluid cylinder 10a therebetween. The piston of that cylinder carries piston rods 11a and 11b at opposite ends, the piston rods being attached to movable platens 6a and 15 respectively. These platens carry plugs 5a and 16 respectively, plug 5a being intended to remove finished articles and plug 16 being used to insert liners 14. Plugs 5a and 16 contain channels 12a and 17, respectively, connected to a source of vacuum or pressure fluid, or both, by means of pipes 13a and 18. An actuating fluid cylinder 23 is provided, having a piston rod 24 linked to attachment 8a, the cylinder 23 being mounted firmly upon the injection blow molding apparatus in such a manner that attachment 8a may be caused to move relative to the blow mold 4 shown in FIG. 1. Attachment 8a also carries a lug 19 which may be brought into engagement with open clevis 20 having prongs 21 capable of turning lug 19 and therethrough the entire attachment 8a in the direction of the circular arrow, by torque applied through shaft 22, from a conventional motor, not shown.

Instead of a liner-actuator such as cylinder 23 in FIG. 2, a rotary actuator may be used to move the attachment as shown in FIG. 3, in which the attachment 8a is connected by means of rod 24a to a rotatable column 26, by means of collar 25. Column 26 carries spline 27 which is engaged by a rack 28, movable in the direction of the arrow, as under the action of a fluid cylinder, not shown. Upon movement of the rack, the column turns in the direction of the circular arrow and carries the attachment 8a along a circular path relative to the injection blow molding apparatus and the blow mold.

In operation, attachment 8a is positioned by means of cylinder 23 in FIG. 2, or rotary column 26 in FIG. 3, so that plug 5a is aligned with the blow mold in discharge position upon completion of a molding cycle, as above described in connection with FIG. 1. Plug 5a is inserted into the finished article and withdrawn therewith from the blow mold under action of cylinder 10a, acting upon the plug 5a by means of platen 6a.

Attachment 8a is then moved by means of cylinder 23, or rotating column 26 into a position at which plug 5a with the article thereon is juxtaposed the location at which it is desired to deposit the article. In alignment with that location, but facing plug 16, one or more liners 14 are held in a magazine 29, shown in FIG. 2. As plug 5a is withdrawn from the finished article under action of cylinder 10a, the piston rod 11b acting upon plug 16 through platen 15, urges plug 16 into engagement with sleeve 14. In order to bring plug 16 into alignment with blow mold 4 for the purpose of depositing liner 14 therein, attachment 8a is rotated 180° by means of clevis 20 and upon completion of such rotation, the attachment is transferred into juxtaposition with blow mold 4, by means of cylinder 23, or rotary column 26. The liner 14 is discharged into the blow mold which may then carry it into alignment with blow core 3, as shown in FIG. 1. While the blow mold carries the liner 14 in the manner described, the attachment 8a remains in position until the injection blow molding cycle is completed, to receive the finished article at the end of that cycle, provided that the plugs 5a and 16 are suitable either to receive finished articles, or liners. If that is not the case, depending on the shape of the article and of the liner, respectively, the attachment 8a is returned to the position at which it discharges articles and receives liners immediately upon depositing a liner into the blow mold, as above, preferably while the blow mold transports the liner to the blow core. Upon its return to that position, the attachment 8a is again rotated by means of clevis 20, thereby positioning plug 5a suitably for removing the next finished article from the blow mold 4.

As shown in FIG. 2, plugs 5a and 16 are arranged to move at the same time under the action of a single cylinder 10a. It is of course possible to move the two plugs independently of each other, by other conventional means. If it is desired to minimize the time for applying liners to plug 16, the magazine 29 may be arranged to move on a path above attachment 8a and at least for a time in synchronism therewith, so that a liner may be transferred onto plug 16 in the course of its movement toward, or away from the blow mold 4. It is also possible to employ several attachments 8 to cooperate with one or more blow molds, whereby the attachments may be of the kind shown in FIG. 1, having a single plug, or of the kind shown in FIG. 2, having two plugs, for alternate positioning of liners and removal of finished articles.

While a single blow core, blow mold, parison mold and plug is shown in the figures, it is understood that the same apparatus may be employed in connection with a multiplicity of these elements of the apparatus, arranged for simultaneous molding of several articles at the same time.

What is claimed is:

1. In the method of making a composite plastic article in the injection blow molding process wherein a parison is injection molded on a blow core in a parison mold, is transferred on the blow core to a blow mold and blown therein into the form of the finished article, the improvement comprising shifting the blow mold with the finished article therein to a discharge station, removing the finished article at said discharge station, inserting a preformed liner into said blow mold, returning the blow mold with the liner therein into the path of the blow core, transferring the liner to the blow core, and then injection molding plastic in the parison mold about the liner to form a composite parison.

2. A method according to Claim 1 wherein the preformed liner is inserted into the blow mold at a location spaced from said discharge station.

3. A method according to Claim 1 wherein the preformed liner is inserted into the blow mold by a first transfer device and wherein the finished article is removed from the blow mold by a second transfer device.

4. The method set forth in Claim 1 wherein the preformed liner is applied to a transfer device in a receiving station and the transfer device is shifted into position to introduce the liner into the blow mold in said discharge station.

5. A method according to Claim 4 wherein said transfer device removes the finished article at said discharge station and also introduces the liner into the blow mold.

6. A method according to Claim 4 wherein said preformed liner is held on said transfer device by the use of suction applied thereon.

7. A method according to Claim 4 wherein said transfer device is shifted in a straight path into position to introduce the liner into the blow mold.

8. A method according to Claim 4 wherein said transfer device is shifted in an arcuate path into position to introduce the liner into the blow mold.

9. A method according to Claim 4 wherein said transfer device is inserted into said preformed liner and held thereon by suction and wherein the preformed liner is introduced into the blow mold by release of the suction.

10. A method according to Claim 4 wherein the preformed liner is applied to the transfer device from a magazine holding a plurality of preformed liners.

References Cited

UNITED STATES PATENTS

| | | | |
|---|---|---|---|
| 3,247,550 | 4/1966 | Haines, Jr. | 264—275 X |
| 3,349,155 | 10/1967 | Valyi | 264—97 |
| 3,357,045 | 12/1967 | Ninneman | 264—97 X |
| 3,358,062 | 12/1967 | Lemelson | 264—97 X |
| 3,616,491 | 11/1971 | Vollers | 425—242 G |

JAN H. SILBAUGH, Primary Examiner

U.S. Cl. X.R.

264—278, 335, Dig. 78; 425—Dig. 209, Dig. 213, Dig. 234